(12) United States Patent
Sankarasubramaniam et al.

(10) Patent No.: US 9,311,308 B2
(45) Date of Patent: Apr. 12, 2016

(54) CONTENT RECOMMENDATION FOR GROUPS

(75) Inventors: Yogesh Sankarasubramaniam, Bangalore (IN); Krishnan Ramanathan, Bangalore (IN); Sriganesh Madhvanath, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 328 days.

(21) Appl. No.: 13/882,178

(22) PCT Filed: Oct. 29, 2010

(86) PCT No.: PCT/IN2010/000711
§ 371 (c)(1),
(2), (4) Date: Apr. 27, 2013

(87) PCT Pub. No.: WO2012/056463
PCT Pub. Date: May 3, 2012

(65) Prior Publication Data
US 2013/0218905 A1      Aug. 22, 2013

(51) Int. Cl.
*G06F 17/30* (2006.01)
*H04N 21/45* (2011.01)
*H04N 21/466* (2011.01)
*G06Q 30/02* (2012.01)

(52) U.S. Cl.
CPC .... *G06F 17/30029* (2013.01); *G06F 17/30828* (2013.01); *G06Q 30/0201* (2013.01); *H04N 21/4532* (2013.01); *H04N 21/4661* (2013.01); *H04N 21/4668* (2013.01)

(58) Field of Classification Search
None
See application file for complete search history.

(56) References Cited

U.S. PATENT DOCUMENTS 6,327,590 B1 *  12/2001  Chidlovskii et al. ......... 707/734
7,454,417 B2 *  11/2008  Tong et al. .......................... 1/1
(Continued)

FOREIGN PATENT DOCUMENTS

CN      1663265       8/2005
CN     101107852      1/2008

OTHER PUBLICATIONS

Author: Zhiwen Yu, Xingshe Zhou, Yanbin Hao, Jianhua Gu; Title: "TV program recommendation for multiple viewers based on user profile merging"; Date: Jun. 10, 2006; Publisher: Springer; Pertinent Pages: whole document as attached (20 pages).*
Z. Yu et al., "TV program recommendation . . . ," User Model User-Adap Inter (2006) 16:63-82, DOI 10.1007/s11257-006-9005-6, dated Jun. 10, 2006.
(Continued)

*Primary Examiner* — Anh Tai Tran
(74) *Attorney, Agent, or Firm* — HP Inc. Patent Department

(57) ABSTRACT

A method and apparatus for joint profiling for identifying one or more common interests of members of a group and recommending items accordingly. The method comprises receiving a user profile for each member, the user profile comprising a set of one or more topics of interest to that member; automatically mapping at least one topic from each of the profiles to a concept; deriving a group profile, in dependence upon the concepts and the topics; and generating a list of recommended items for the group based on the group profile. Also presented is a method and apparatus for joint profiling wherein a joint weight for each topic is calculated by: for each user, calculating the reciprocal of a weight associated with the topic for that user; calculating the sum of the resulting reciprocals; and calculating the joint weight as the reciprocal of the resulting sum.

12 Claims, 4 Drawing Sheets

(56) References Cited

U.S. PATENT DOCUMENTS

| | | |
|---|---|---|
| 2004/0003392 A1 | 1/2004 | Trajkovic et al. |
| 2006/0020973 A1 | 1/2006 | Hannum et al. |
| 2009/0125464 A1 | 5/2009 | Shi |
| 2009/0164897 A1* | 6/2009 | Amer-Yahia et al. ......... 715/703 |
| 2011/0016121 A1* | 1/2011 | Sambrani et al. ............ 707/734 |

OTHER PUBLICATIONS

Written opinion and international search report in corresponding PCT patent application, PCT/IN2010/000711, dated Aug. 11, 2011.

Jameson, Anthony et al. "Recommendation to groups." In The adaptive web, pp. 596-627. Springer Berlin Heidelberg, 2007.

PCT International Search Report, Aug. 11, 2011, PCT Patent Application No. PCT/IN2010/000711, Filed Oct. 29, 2010.

* cited by examiner

CONTENT RECOMMENDATION FOR GROUPS

BACKGROUND

People often consume media content in groups, in a shared setting. For example, the members of a family may watch TV, DVDs or on-demand video services together; and a group of friends may listen to music together. This is particularly common in households in some emerging economies, where an entire family may share access to a single device, such as a TV or personal computer. In such a shared setting, it is desirable for the group to be able to find content that has a greater chance of being liked by everyone.

In the past, websites have used tools such as collaborative filtering to generate recommendations for individual users, based on their existing consumption patterns or feedback (such as ratings) received in response to content previously consumed. However, the group recommendation scenario presents new and different challenges to those of generating recommendations for individual users.

BRIEF DESCRIPTION OF THE DRAWINGS

For a better understanding of the invention, embodiments will now be described, purely by way of example, with reference to the accompanying drawings, in which.

DETAILED DESCRIPTION OF THE INVENTION

According to embodiments, user profiles can be used to construct a joint profile, which can then be used to source new content that would be of common interest to all the members of a group. This may allow users to "discover" joint interests, which could be pleasantly surprising and therefore enhance the consumption experience.

Figure 1:
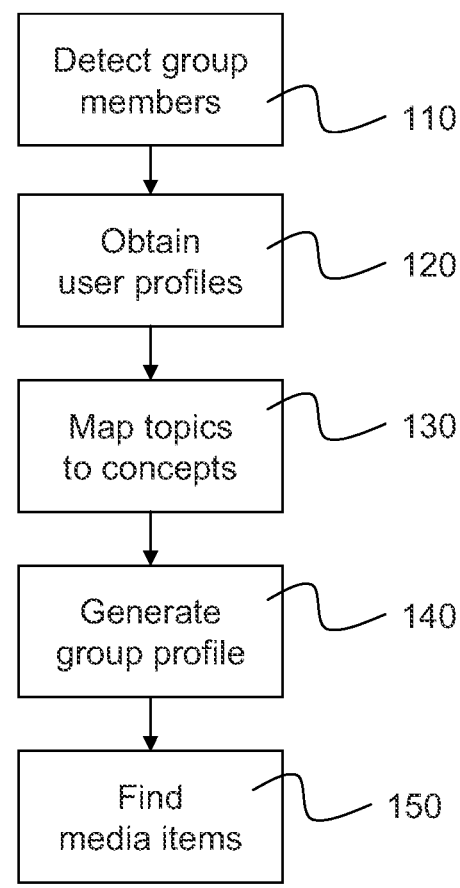
FIG. 1 is a flowchart of a method of joint profiling according to an embodiment.

An embodiment will now be described with reference to FIG. 1. FIG. 1 shows a flowchart of a method of joint profiling for identifying one or more common interests of members of a group and recommending media items accordingly. The method comprises: receiving 120 a user profile for each member, the user profile comprising a set of one or more topics of interest to that member; using a computing device, automatically mapping 130 at least one topic from each of the profiles to a concept that is semantically related to the topic; deriving 140 a group profile, in dependence upon the concepts and the topics from each user profile, the group profile comprising a set of one or more topics or concepts of potential interest to the group; and generating 150 a list of recommended media items for the group based on the group profile. Before receiving the user profiles in step 120, the method of this embodiment comprises a preparatory step of detecting 110 the members of the group who are present.

Figure 2:
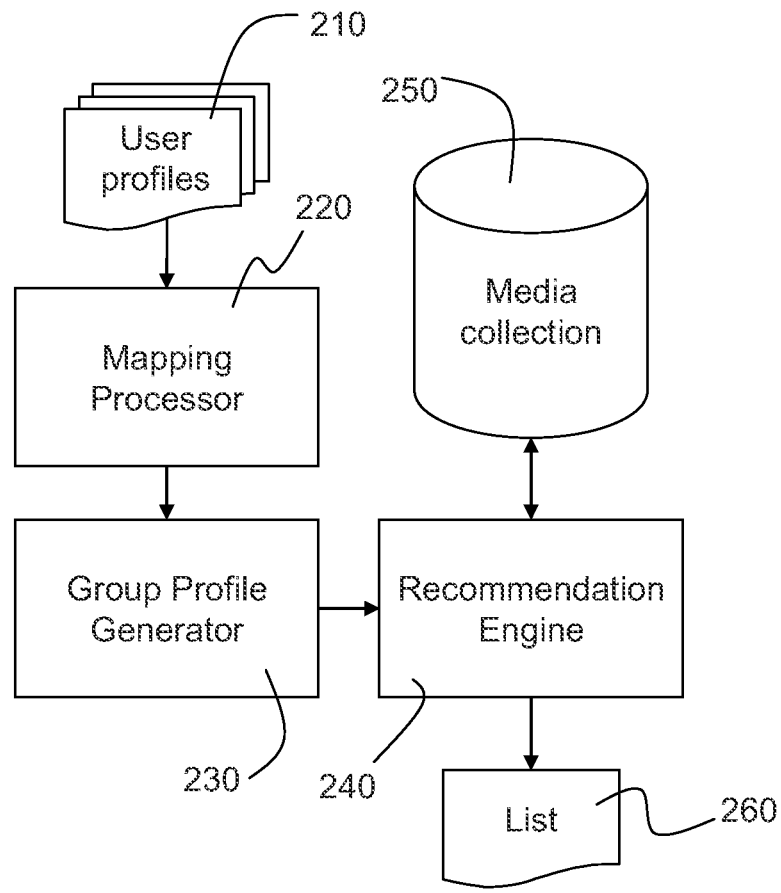
FIG. 2 is a block diagram of a recommendation apparatus according to an embodiment.

An apparatus arranged to perform the method of FIG. 1 is illustrated in the block diagram of FIG. 2. FIG. 2 shows an embodiment of a media recommendation apparatus, for identifying one or more common interests of members of a group and recommending media items accordingly. The apparatus comprises: an input, for receiving a user profile 210 for each member, the user profile comprising a set of one or more topics of interest to that member; a mapping processor 220, adapted to automatically map at least one topic from each of the profiles 210 to a concept that is semantically related to the topic; a group profile generator 230, adapted to derive a group profile, in dependence upon the concepts and the topics from each user profile, the group profile comprising a set of one or more topics or concepts of potential interest to the group; and a recommendation engine 240, adapted to generate a list 260 of recommended media items for the group based on the group profile. The media items are stored in and retrieved from a media collection or database 250.

The embodiment will now be described in greater detail. In this embodiment, the joint profiling system is applied to recommend videos for a group of users to watch together. This may involve recommending video content on the internet, such as online TV channels, or the recommendations may be provided as part of the user interface for a Video-On-Demand (VOD) service.

The first step in the exemplary method of FIG. 1 is to detect, in step 110, users in front of the consumption device—for example a TV or computer—who wish to consume content simultaneously as a group. This can be done using face recognition, for example, or other similar user identification schemes. Alternatively, users could manually indicate their presence to the system.

It is assumed that N users $U_1, U_2, U_N$ were detected in step 110. Next, user profiles 210 for each of the N individual users are retrieved 120. The individual profiles may be stored as files of suitable format on the client device illustrated in FIG. 2 or hosted remotely, for example using a cloud service. In some examples, a file may contain a description of the user profile in eXtensible Markup Language (XML).

The individual profiles are denoted as $P_1, P_2, P_N$. Each Pi contains user $U_i$'s profile, with each entry in the following format:

<topic>:<weight>

The topic is some subject of interest to the user. The magnitude of the weight indicates the relative intensity or level of interest of the user in that topic. The $j^{th}$ topic of the $i^{th}$ user, $U_i$, is denoted by $topic_j[i]:w_j[i]$. In the present embodiment, examples of topics may be 'roger federer'; 'us open'; 'Nash equilibrium'; 'Russell Crowe'; 'Bermuda triangle'; and 'Duck tales'. It is assumed that the weights $w_j[i]$ are non-negative, and $\Sigma_j w_j(i)=1$. That is, for a given user, i, the sum of the weights across different topics, j, is equal to one.

The user profile may be created by each user manually: for example, the user could explicitly indicate the topics and corresponding weights. Alternatively, the profile may be generated by automatic methods. For example, in the present embodiment, for the purposes of video recommendation, the user profile is generated from the meta-data description of the videos previously watched by the user. This metadata can include the title, description, tags, user comments, and so on. A user profile could also be generated by semi-automatic methods: for example, the user may provide ratings for previously watched videos. Each of these ratings would be assigned to the set of topics that is associated with the corresponding video and the average rating for a given topic can then be used as the topic weight (subject to suitable normalization, as indicated above).

One suitable method for automatically generating the user profile will now be described, as used in the present embodiment. In this method, key-phrases are extracted from the meta-data descriptions of videos previously watched by the user, and these key-phrases are used as the topics in the user profile. Key-phrases are identified as those words or phrases occurring most frequently in a given meta-data description. That is, the description is parsed to extract word level n-grams. A word-level n-gram is a sequence of n consecutive words occurring somewhere in the metadata. Once all n-grams have been extracted, their frequencies of occurrence can be counted. The key-phrases are chosen as one or more sequences of words which have the maximum frequencies.

The weight associated with each topic in the user profile can be input manually by the user, or may be generated automatically. In one embodiment, the user profile is generated by the automated method described above and the weight assigned to each topic is the corresponding frequency with which it occurred, in the meta-data description in question. Optionally, this frequency can also be weighted by the Inverse Document Frequency. Thus, a word (or phrase) which occurs commonly among lots of the documents in the corpus will receive a relatively lower weight, whereas a word or phrase which is rare in the overall corpus will receive a relatively higher weight. This reflects the fact that words occurring commonly in lots of descriptions do not convey much meaning about the user's interest in specific topics (even if the words occur also relatively frequently in a single description).

If the same topic is derived from the meta-data descriptions of two or more previous videos watched by a user, then the weights derived in respect of each description will be combined, for example by adding them together.

User ratings of previously watched videos can also be incorporated in the weighting scheme. For example, if a user rated a previous video highly, the corresponding weights of topics derived from that video could be increased suitably.

In the next stage 130 of the process the topics from each of the profiles are automatically mapped, by means of a mapping processor 220, to concepts that are semantically related to the topic. In one embodiment, this mapping is accomplished by searching a corpus of documents for documents related to the topic.

In a first exemplary embodiment, the corpus is the collection of Wikipedia articles. These were downloaded and indexed using the Apache Lucene search engine. The topic-concept mapping is achieved by using the topics in the user profile as search queries. In response to these queries, the search engine returns a list of Wikipedia articles which include the searched-for term. The concepts are determined by the titles of these articles. Preferably, the titles of a small number of top-ranked search results are used. The topic-concept mapping is used to identify the hidden relationships among the topics of the various users—boosting related topics and suppressing isolated topics.

As will be apparent to those skilled in the art the queries may be constructed from the topics directly, or further processing may be applied. For example, topics that comprise multi-word phrases may be split into smaller phrases or single words. Likewise, topics may also be combined in conjunctive queries. This may assist in finding relevant concepts. For example, if the user profile contains the topics "Roger Federer" and "Pete Sampras", a query for both together may return an article entitled "Grand Slam men's singles champions". This would be a suitable concept for joint profiling, because it generalises the specific topics present in the user profile. Based on the interest in these two champions, this user is also likely to have a reasonable degree of interest in other men's singles champions.

In a second exemplary embodiment of the mapping step, the corpus of documents is a collection of videos with associated meta-descriptions—for example, as found on the YouTube website. In this case, the YouTube collection is searched using the topics present in the user profile. Then, instead of merely using the titles of the videos, the meta-data descriptions of the retrieved videos are parsed in a manner similar to that described above for extracting topics. That is, the word-level n-grams are extracted from the meta-data and the most frequently occurring words and phrases are used as the concepts.

In both cases, the use of the topics as query terms to search a corpus enables a kind of semantic abstraction from the topics to the concepts. Similar semantic connections can be achieved by using topics as queries to an ontology, such as Wordnet, or a directory, such as DMOZ. In the former case, the concepts can be chosen from among the synonyms of the topics. In the latter case, the concepts can be chosen as the categories retrieved in response to the topic-query.

Figure 3:
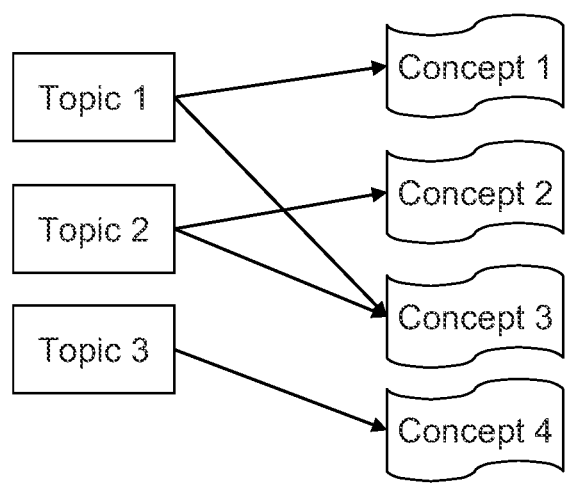
FIG. 3 illustrates a bipartite mapping generated between a set of topics to a set of concepts.

Clearly, a given topic can map to several concepts; and different topics from different users may map to the same concept. Thus, we obtain a bipartite graph structure G between the topics of the group of users and concepts, with the topics forming one set of nodes and the concepts forming the other set of nodes. A simple example of such a graph is shown in FIG. 3.

Before moving on to the joint profiling algorithm, one can perform an optional 'pruning' of the concepts, whereby only those concepts that are connected (in the graph G) to topics associated with more than one user are retained. The idea is to retain only those concepts in which multiple users show interest. This can allow for a faster and more efficient joint profile computation.

In the next stage 140, a group profile is generated, using group profile generator 230. The exemplary joint profiling algorithm used in the present embodiment will now be described, with reference to FIG. 4.

Figure 4:
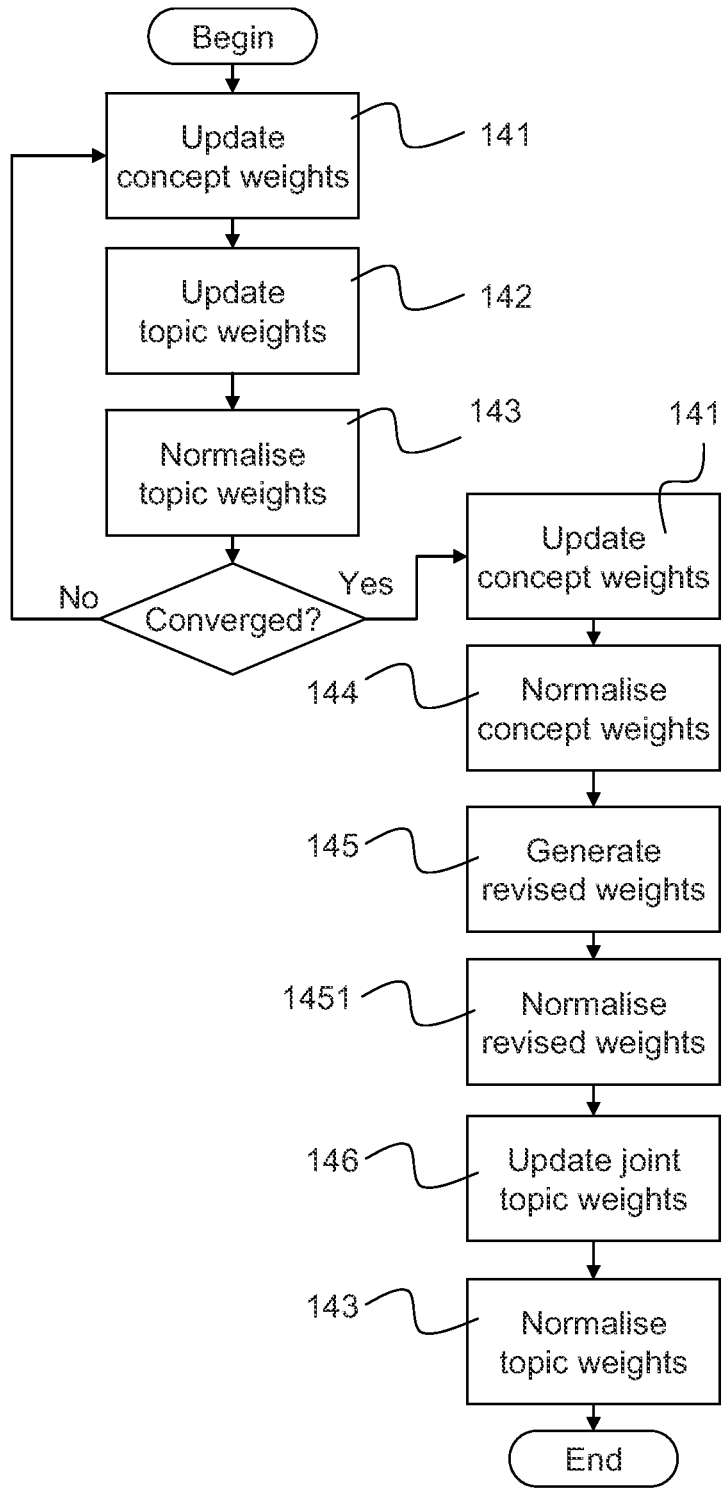
FIG. 4 is a flowchart illustrating a method of generating a group profile, according to the embodiment of FIG. 1, in greater detail.

There are two main phases in FIG. 4. During the first phase 141, 142, 143, the bipartite graph structure is utilized to update the topic weights. This is performed separately for each user, and consists of iterations only over the topics/concepts of the given user i. Note that the resulting topic weights after Phase 1 now reflect the topic-concept mappings in G, whereas the initial profile weights $w_j[i]$ did not provide any weight data in relation to concepts. Thus, Phase 1 discovers the hidden relationships and the weights at the end of Phase 1 reflect this. This topic-concept based weight update is used as the input to Phase 2, in which the joint topics are identified, based on concept similarity across all users. This approach allows the method to 'discover' joint topics of interest even when the individual profile topics may not exactly overlap. It also provides a potential 'surprise' element by finding joint concepts, which can then be used to source relevant content.

The objective in the second phase 141, 144, 145, 146, 143 of FIG. 4 is to identify joint topics across all users.

The iterative processes of FIG. 4 can be defined as follows.

Phase 1

---

Input:
    Topic-concept mapping G

Output:
   Updated topic and concept weights for each user
Algorithm:
for each user i,
1. Initialize topic weights $Topic_j[i]$ based on profile weights $w_j[i]$
2. Iterate until convergence:
{
Step 141 - update concept weights:

$$Concept_j[i] = \sum_k Topic_k[i]$$

for all $Topic_k$ that map to $Concept_j$ for user i
Step 142 - update topic weights:

$$Topic_j[i] = \sum_k Concept_k[i]$$

for all $Concept_k$ that map to $Topic_j$ for user i
Step 143 - normalize topic weights.
}
end for Here, convergence is detected by measuring the change in concept weights and topic weights between successive iterations. When the maximum absolute difference drops below a preset threshold, the iterations are stopped. In this embodiment, a threshold value of 0.001 was used. In practice, it is usually found that 3 to 4 iterations are sufficient to achieve convergence. Normalizing the topic weights comprises dividing each weight by the sum of the weights over all topics, for user i.

Phase 2

Input:
   1. Topic-concept mapping G
   2. Updated topic weights from Phase 1
Output:
   Joint topics and joint concepts
Algorithm:
1. Create N bins for each topic and N bins for each concept in G. Topic-bin i will hold the topic weight for user i, and concept-bin i will hold the concept weight for user i.
2. Initialize the topic-bins using the updated topic weights from Phase 1.
3.
{
for each user (bin) i,
Step 141 - update concept weights:

$$Concept_j[i] = \sum_k Topic_k[i],$$

for all $Topic_k$ that map to $Concept_j$ for user i
end for
for each user (bin) u,
Step 144 - normalize concept weights.
Step 145 - generate revised weights:

$$tmp_j[u] = \sum_k Concept_k[u],$$

for all $Concept_k$ that map to $Topic_j$ for user u
Step 1451 - normalize revised weights
end for
for each user (bin) i
Step 146 - update joint topic weights:

$$Topic_j[i] = \cfrac{1}{\cfrac{1}{Topic_j[i]} + \sum_{u \neq i} \cfrac{1}{tmp_j[u]}}$$

Step 143 - normalize topic weights.
end for
}
4. Calculate the average topic weight and average concept weight (for every topic and concept) over all users/bins.

5. Select the top few topics (those with the highest average weights) and top few concepts (having the highest average weights) as the joint topics and joint concepts, respectively.

Note that in Phase 2, the concept updates in the first 'for' loop are identical to the Phase 1 updates. Then, in the second 'for' loop, the updated concept weights are normalized and used to compute $tmp_j[u]$, which represents the contribution of a user u to the overall group-interest in $Topic_j$. Finally, the third 'for' loop computes joint topics for the group as a whole. The joint weight or cross-weight $Topic_j[i]$ is calculated by taking the reciprocal or inverse of the (revised) weight associated with topic j by each user i; summing together these reciprocals; and taking the reciprocal of the summed result.

This metric for combining the weights (which express the levels of interest of different users in a given topic) helps to find subjects which will be acceptable to the group as a whole.

The next stage in the process is to search 150 for media items according to the group profile generated in step 140, and generate a list of these suggestions for presentation to the group.

Figure 5:
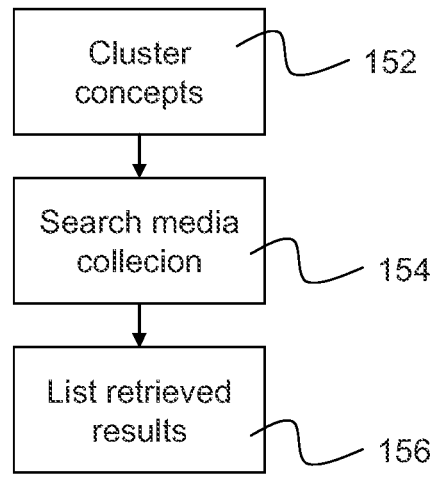
FIG. 5 is a flowchart illustrating a method of finding items, according to the embodiment of FIG. 1, in greater detail.

In the present embodiment, the top-ranked joint topics and joint concepts (output from phase 2 above, in stage 140) are used to find videos in an online video collection. The algorithm used for this is illustrated in FIG. 5.

The first step is a clustering step 152. The joint concepts are clustered into semantically related classes. For instance, if the set of joint concepts is {Roger Federer, Pete Sampras, Albert Einstein, Max Planck}, two clusters will be identified: {Roger Federer, Pete Sampras} and {Albert Einstein, Max Planck} corresponding to the categories "Tennis" and "Physicists", respectively. The objective of the clustering is to use semantically related topics when querying a video repository.

It has been observed that one of the effects of the joint profiling algorithm is that related concepts tend to be assigned similar weights. This happens because the final weights assigned to the joint concepts depend not just on the weights present in the individual user profiles, but also on the structure of the topic-concept graph G. Therefore, even if two apparently different concepts have similar weights, there might be a hidden relationship between them.

The clustering algorithm exploits this observation. It groups together concepts with similar-valued weights. The inputs to the algorithm are: a desired number of clusters; desired number of videos to recommend; and topic-concept mapping graph G. The output is a set of clusters that contain semantically related concepts that can later be used to fetch videos. The algorithm is as follows:

Initialize: iteration=1
   1.    Run Phase I of Joint Profiler
   2.    Run Phrase II of Joint Profiler
   3.    while (Number of clusters < desired number of clusters) do
   {
     a.    From the list of concepts, pick the concept with the greatest weight-value. Initialise a cluster with this concept. Increment the number of clusters.
     b.    Find concepts whose weights are similar to the weight for this concept; add them to the cluster; and remove them from the list of concepts. (The concepts added are those with the next highest weights). In practice, a threshold of 0.01 to 0.2 works well - that is, all concepts that are within 0.01 to 0.2 to the weight of the current concept can be included in the cluster
   }

-continued

4. Merge clusters that are sub-clusters of high-weight clusters, by virtue of their mappings to topics. (Some clusters form sub-clusters in the topic space of the others with higher weights.)
5. Sort clusters by the average weight of the concepts in each cluster.
6. Take the top cluster and fetch $V/2^{(iteration)}$ videos for it using the querying strategy described below. This provides diversity in the recommended content.
7. Remove the concepts in the top cluster from the topic-concept graph.
8. While iteration <= numClusters; Repeat from Step 1; iteration++;

The top few clusters will be used to fetch videos. When two users are highly interested in a particular area, the results tend to be more inclined towards these highly weighted topics as most of the top few clusters would map to them. The algorithm above improves diversity in the results and fetches videos that cover most of the common interests.

Those skilled in the art will appreciate that other clustering algorithms could also be used to group the concepts together based on the similarities among their weight values.

The second step is querying 154. The joint topics and concepts from each of the top few clusters are used to query the video repository. The queries could be subsets or combinations of the topics or concepts in a cluster. For example, if the topics Roger Federer and Pete Sampras came from the profiles of two different users then the query "Roger Federer and Pete Sampras" would find videos of joint interest. To minimize the number of queries (to reduce sourcing latency), the concepts and the joint topics are concatenated into an <OR> query. The top few results are returned. The number of videos retrieved from the collection per cluster is decided based on the weights associated with the joint topics and concepts.

The results are presented to the user as a ranked list in step 156.

Figure 6:
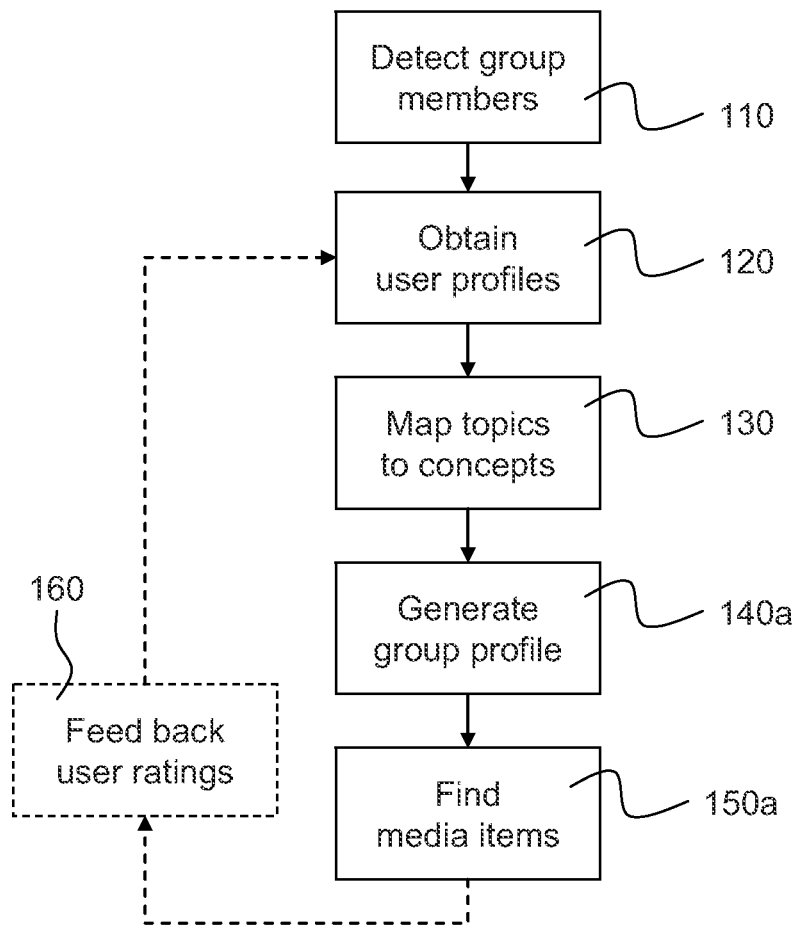
FIG. 6 shows a method of joint profile according to another embodiment.

A second exemplary embodiment will now be described, with reference to FIG. 6. This embodiment is similar to the embodiment of FIG. 1. However, it includes an additional, optional feedback step 160.

As in the first embodiment, the users are presented with the videos in order of ranking. After the users watch the videos, the users are invited to input a rating for the videos. The rating could be binary (for example, "like"/"dislike") or on an integer scale (for example, 1-5 stars). The rating of each user is used to modify the topic weights in the individual user profiles.

One way of doing this is to estimate the posterior probability, $P(w_j[i] | liked)$, that a particular topic j has weight $w_j[i]$ assigned to it, given the fact that the user has indicated that he/she liked/disliked a video associated with this topic. This is done using the formula $P(w_j[i] | liked) = P(liked | w_j[i]) \times P(w_j[i])$, where $P(w_j[i])$ is the prior probability of a given weight value, $w_j[i]$, for topic j for user i. To derive this formula (which is a version of Bayes' theorem), it is assumed that the prior probability, $P(liked)$, of a video being liked is a constant.

For example, if the user liked 3 videos associated with topic j, but disliked 1 video, then $P(liked | w_j[i]) = 0.75$. Let us assume the prior probability of weight $w_j[i]$ is $P(w_j[i]) = 0.1$; then, the posterior probability is $0.75 \times 0.1 = 0.075$. This is repeated for all topics for a given user i. Then the weights are set equal to the posterior probabilities thus computed and normalized for each user.

The updated user profiles can now be incorporated into the next cycle of joint profiling as the user rating input in FIGS. 2 and 5.

As the skilled person will understand from reading the above description of the exemplary embodiments, methods according to the invention can be applied to generate recommendations for items of all kinds. Media items are one broad class of items that may benefit from a group recommendation system according to embodiments. Clearly, the method is not limited to recommending TV channels, programs or videos. Other media items may include (but are not limited to) web-sites or blogs; CDs, audiobooks, music downloads or podcasts; books, recipes, essays, or news articles; and assorted multimedia content of all kinds. Methods and apparatus according to other embodiments can be used to generate recommendations for non-media items. For example, restaurant recommendations could be generated for a group, based on a set of user profiles representing the culinary interests of each of the members.

In some embodiments, topics and concepts can be represented by words, parts of words, or combinations of words.

In the step of mapping the topic to a concept, the concept to which the topic is mapped should preferably be at the same or a higher level of abstraction, compared with the topic. That is, a concept is preferably a more general or generic description of a topic; whereas a topic is preferably a more specific description than the corresponding concept. However, in general, it is also possible for some topics to be mapped to a concept that is identical to the topic. Two different topics, contained in the user profiles of different users, can preferably be mapped to the same concept. Exemplary ways of achieving the desired mappings have been described above. However, other methods can be used in other embodiments.

A topic or concept of interest to the group would ideally be one in which all members of the group are interested. However, it may be a topic that is of interest to most of the group or as many of the group as possible.

Topics can be associated with corresponding weights, though this is not always essential. These weights may be numerical weights, which quantify the degree of interest or preference of the user in the given topic.

The mapping from topics to concepts facilitates a kind of "query modification", which permits the interests of individual users to be generalized, in order to characterize the interests of the group.

Embodiments may be particularly useful in the context of share, simultaneous consumption. For example, the members of the group may wish to watch, listen to or eat the same thing together, at the same time. However, simultaneous (that is, concurrent) consumption by the whole group is not an essential feature. In some embodiments, the recommended content may be consumed by individual users at different times. The system could recommend a book, for example, which might be read by one user at a time, but which is of interest to all the users, so that they can share their experiences with one another afterwards.

Embodiments for recommending media items such as videos may be advantageously implemented in a TV, set-top box or computer. In a set-top box, components such as those shown in FIG. 2 may be designed as bespoke hardware elements. In a computer, it is likely that the functions of these elements will be performed by a general purpose processor which has been suitably programmed. Likewise, embodiments may be implemented as a mixture of hardware and software (or firmware) components. Design of components will be within the capabilities of those skilled in the art.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of joint profiling for identifying one or more common interests of members of a group and recommending items accordingly, the method comprising:
   receiving a user profile for each member, the user profile comprising a set of one or more topics of interest to that member;
   using a computing device, automatically mapping at least one topic from each of the profiles to a concept that is semantically related to the topic by using the at least one topic as a query term in a search;
   using the computing device, for each member, determining a weight associated with each concept to which the topics have been mapped, by iteratively updating the concept-weight as a sum of topic-weights of the topics mapped to the concept and then updating the topic-weight for each topic as a sum of the concept-weights of the concepts to which the topic maps until convergence results;
   deriving a group profile, in dependence upon the concepts and the topics from each user profile, the group profile comprising a set of one or more topics or concepts of potential interest to the group; and
   generating a list of recommended items or the group based on the group profile.

2. The method of claim 1, wherein:
   each user profile comprises the topic-weight associated with each topic in that profile, the weight representing the degree of interest of the corresponding member in the given topic; and
   the group profile is derived based on the topic-weights.

3. The method of claim 2, wherein the concept-weights are derived from the weights associated with the corresponding topics,
   and wherein the group profile is derived based on the concept-weights.

4. The method of claim 3, wherein the step of deriving the group profile includes calculating a joint weight associated with each topic, the joint weight being calculated by:
   for each user, calculating the reciprocal of a weight associated with the topic for that user;
   calculating the sum of the resulting reciprocals; and
   calculating the joint weight as the reciprocal of the resulting sum.

5. The method of claim 3, wherein the step of deriving the group profile comprises:
   for each user, updating the concept-weights based on the topic-weights;
   for each user, generating revised topic-weights based on the updated concept-weights; and
   for each user, updating the topic-weights based on the corresponding revised topic weights for the other users, by, for each topic, updating the topic-weight as the reciprocal of a topic sum, the topic sum equal to a reciprocal of the topic-weight for the user plus an other user sum, the other user sum equal to a reciprocal of a sum of the topic-weights for the other users.

6. The method of claim 1, wherein the step of automatically mapping a topic to a semantically related concept comprises:
   searching for instances of the topic in a corpus of documents; and
   determining the concept based on one or more retrieved documents resulting from the search.

7. The method of claim 6, wherein the step of determining the semantically related concept comprises at least one of:
   i. determining the concept based on the title of a retrieved document; or
   ii. parsing a retrieved document to extract sequences of consecutive word;
   determining the frequencies of occurrence of said sequences in the document; and
   determining the concept based on the one or more most frequently occurring sequences of words.

8. The method of claim 1, wherein the step of generating a list of recommended items comprises:
   searching a collection for items related to each of the topics and/or concepts in the group profile;
   retrieving a number of items for each topic or concept; and
   generating the list of recommended items from the retrieved items,
   wherein an item which was retrieved in response to a greater number of queries is ranked more highly in the list than an item which was retrieved in response to a lesser number of queries.

9. The method of claim 8, wherein the group profile includes a joint weight associated with each topic or concept, the joint weight indicating the combined degree of interest of the group in that topic or concept,
   and wherein, in the step of retrieving items, the number of items retrieved for each topic or concept is dependent on the corresponding joint weight.

10. The method of claim 8, further comprising clustering the topics and/or concepts in clusters, wherein the topics and/or concepts in a given cluster are semantically related,
   and wherein the step of searching the collection comprises searching for items related to each of the clusters.

11. A method of joint profiling for identifying one or more common interests of members of a group and recommending items accordingly, the method comprising:
   receiving a user profile for each member, the user profile comprising a set of one or more topics of interest to that member, each topic having a respective associated weight denoting the level of interest of that member in the topic;
   deriving a group profile, in dependence upon the topics and weights from each user profile, the group profile comprising a set of one or more topics of potential interest to the group, with respective associated joint weights; and
   generating a list of recommended items for the group based on the group profile, wherein the joint weight for each topic is calculated by:
   for each user, calculating the reciprocal of a weight associated with the topic for that user;

calculating the sum of the resulting reciprocals;

for each user, calculating a topic-weight for the topic as the reciprocal of a topic sum, the topic sum equal to the reciprocal of the weight associated with the topic for that user plus an other user sum, the other user sum equal to a reciprocal of the weights associated with the topic for the other users; and calculating the joint weight as an average of the topic-weights for the users the reciprocal of the resulting sum.

12. A recommendation apparatus, for identifying one or more common interests of members of a group and recommending items accordingly, the apparatus comprising:

a processor;

a non-transitory computer-readable medium storing computer-executable code executed by the processor to implement;

an input, for receiving a user profile for each member, the user profile comprising a set of one or more topics of interest to that member;

a mapping processor, adapted to automatically map at least one topic from each of the profiles to a concept that is semantically related to the topic by using the at least one topic as a query term in a search;

a weight generator adapted to, for each member, determine a concept-weight associated with each concept to which the topics have been mapped, by iteratively updating the weight as a sum of topic-weights of the topics mapped to the concept and then updating the topic-weight for each topic as a sum of the concept-weights of the concepts to which the topic maps until convergence results;

a group profile generator, adapted to derive a group profile, in dependence upon the concepts, the topics, the topic-weights, and the concept-weights from each user profile, the group profile comprising a set of one or more topics or concepts of potential interest to the group; and a recommendation engine, adapted to generate a list of recommended items for the group based on the group profile.

* * * * *

UNITED STATES PATENT AND TRADEMARK OFFICE
CERTIFICATE OF CORRECTION

PATENT NO. : 9,311,308 B2  
APPLICATION NO. : 13/882178  
DATED : April 12, 2016  
INVENTOR(S) : Yogesh Sankarasubramaniam et al.

It is certified that error appears in the above-identified patent and that said Letters Patent is hereby corrected as shown below:

In the claims

In column 9, line 45, in Claim 1, delete "or" and insert -- for --, therefor.

In column 10, line 23, in Claim 7, delete "word" and insert -- words --, therefor.

In column 11, line 17, in Claim 12, delete "implement;" and insert -- implement: --, therefor.

Signed and Sealed this  
Twenty-third Day of August, 2016

Michelle K. Lee  
*Director of the United States Patent and Trademark Office*